(12) United States Patent
Kristofcsak

(10) Patent No.: US 9,657,836 B2
(45) Date of Patent: May 23, 2017

(54) PARKING MECHANISM ARRANGEMENT FOR A MOTOR VEHICLE TRANSMISSION

(71) Applicant: GETRAG Getriebe- und Zahnradfabrik Hermann Hagenmeyer GmbH & Cie KG, Untergruppenbach (DE)

(72) Inventor: Andras Kristofcsak, Leverkusen (DE)

(73) Assignee: GETRAG GETRIEBE-UND ZAHNRADFABRIK HERMANN HAGENMEYER GMBH & CIE KG, Untergruppenbach (DE)

( * ) Notice: Subject to any disclaimer, the term of this patent is extended or adjusted under 35 U.S.C. 154(b) by 140 days.

(21) Appl. No.: 14/662,809

(22) Filed: Mar. 19, 2015

(65) Prior Publication Data

US 2015/0267811 A1   Sep. 24, 2015

(30) Foreign Application Priority Data

Mar. 21, 2014   (DE) .......................... 10 2014 103 914

(51) Int. Cl.
*F16H 63/34*   (2006.01)

(52) U.S. Cl.
CPC ..... *F16H 63/3433* (2013.01); *F16H 63/3416* (2013.01); *F16H 63/3425* (2013.01)

(58) Field of Classification Search
CPC ............ F16H 63/3491; F16H 63/3425; F16H 63/3483; F16H 63/3433
See application file for complete search history.

(56) References Cited

U.S. PATENT DOCUMENTS 3,703,941 A    11/1972  Ohie et al.
7,861,839 B2 *  1/2011  Schweiher .......... F16H 63/3433
                                                192/220.2
(Continued)

FOREIGN PATENT DOCUMENTS

CN   102135177 A    7/2011
CN   102720834 A   10/2012
(Continued)

OTHER PUBLICATIONS

European Search Report dated Aug. 6, 2015, 6 pages.
(Continued)

*Primary Examiner* — Jacob S Scott
*Assistant Examiner* — Lillian Nguyen
(74) *Attorney, Agent, or Firm* — Reising Ethington, P.C.

(57) ABSTRACT

A parking mechanism arrangement for a motor vehicle transmission has a housing and a shaft supported so that it can rotate in relation to the housing. A parking mechanism gear is rotationally fixed to the shaft and comprises a parking mechanism tooth system. A parking mechanism pawl is supported so that it can pivot about a pawl axis in relation to the housing and comprises a pawl tooth, which is capable of engaging in a tooth space of the parking mechanism tooth system in order to establish a locked position. An actuating mechanism comprises an actuating element, which acts upon an actuating portion of the parking mechanism pawl in order to pivot the parking mechanism pawl from a release position into the locked position. The actuating element is embodied as a cam ring, which is arranged concentrically with the shaft and which comprises a cam portion, which acts on the actuating portion in order to establish the locked position.

11 Claims, 3 Drawing Sheets

(56) References Cited

U.S. PATENT DOCUMENTS

2013/0256089 A1  10/2013  Burgardt et al.
2014/0060994 A1   3/2014  Burgardt

FOREIGN PATENT DOCUMENTS

| DE | 2101822 A1 | 7/1971 |
| DE | 102008000481 A1 | 9/2009 |
| DE | 102012007061 A1 | 10/2013 |
| DE | 102012017817 A1 | 3/2014 |
| EP | 1865237 A1 | 12/2007 |
| EP | 2657578 | 10/2013 |
| JP | 2011098677 A | 5/2011 |
| KR | 1020040006981 A | 1/2004 |

OTHER PUBLICATIONS

German Search Report for German Patent Application No. 10 2014 103 914.9 filed Mar. 21, 2014. mailed on Dec. 8, 2014, 7 pages.
Chinese Office Action for Application No. 201510125649.0 Dated Aug. 24, 2016, 5 pages.
English Translation of Chinese Office Action for Application No. 201510125649.0 Dated Aug. 24, 2016, 7 pages.

* cited by examiner

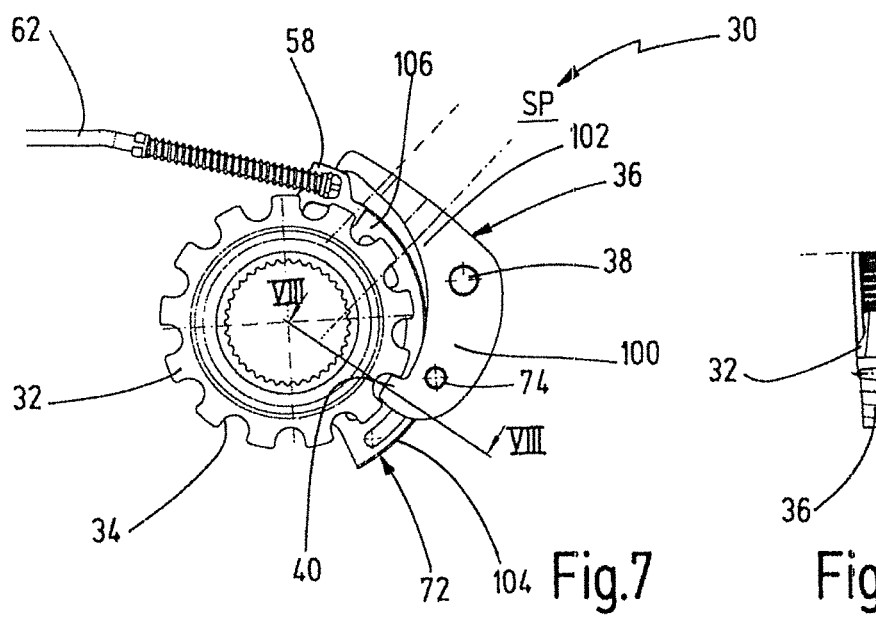
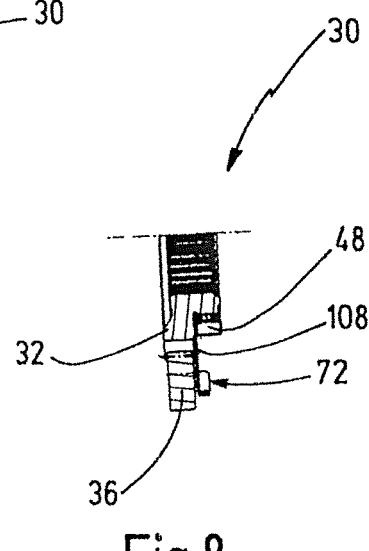
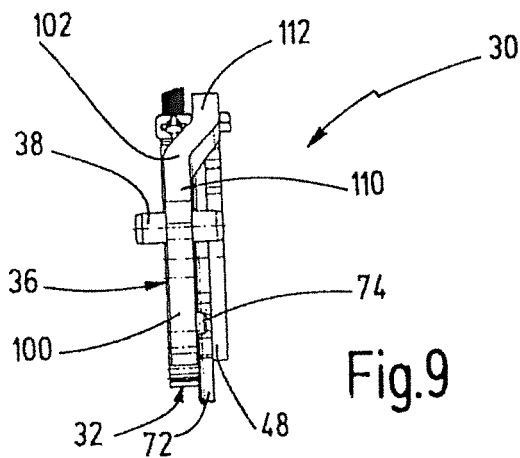
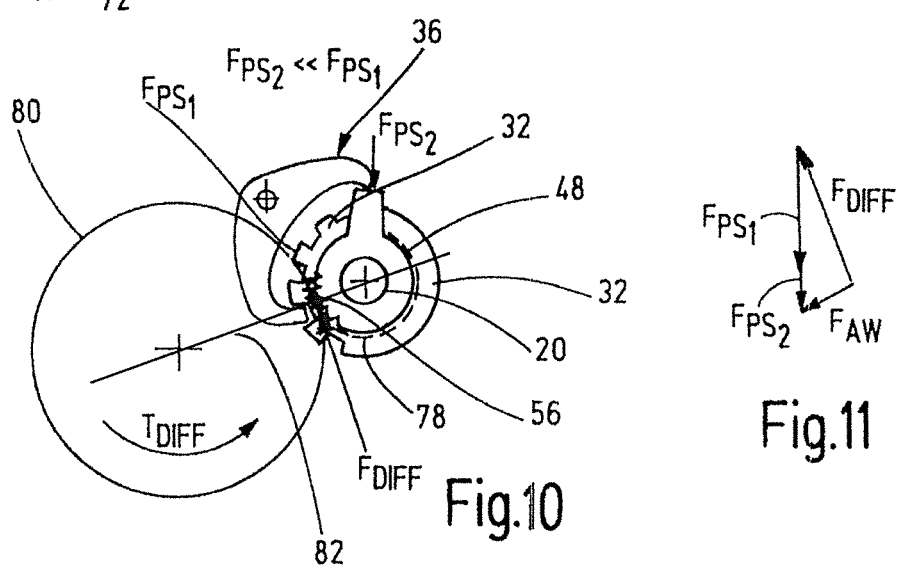
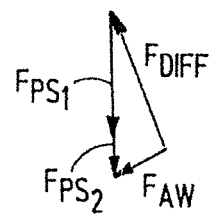

PARKING MECHANISM ARRANGEMENT FOR A MOTOR VEHICLE TRANSMISSION

CROSS REFERENCES TO RELATED APPLICATIONS

This application claims priority from German patent application DE 10 2014 103 914.9, filed on Mar. 21, 2014.

BACKGROUND OF THE INVENTION

The present invention relates to a parking mechanism arrangement for a motor vehicle transmission having a housing and a shaft supported so that it can rotate in relation to the housing, a parking mechanism gear which is rotationally fixed to the shaft and comprises a parking mechanism tooth system, a parking mechanism pawl which is supported so that it can pivot about a pawl axis in relation to the housing and comprises a pawl tooth, which is capable of engaging in a tooth space of the parking mechanism tooth system in order to establish a locked position, and having an actuating mechanism which comprises an actuating element, which acts upon an actuating portion of the parking mechanism pawl, in order to pivot the parking mechanism pawl from a release position into the locked position.

Parking mechanism arrangements of this type are generally known. These serve in a motor vehicle transmission, especially in a motor vehicle automated transmission, to immobilise the vehicle. Here the shaft is preferably an output shaft of the transmission which is operatively connected directly to the driven wheels of the motor vehicle. In the locked position a rotation of the shaft is prevented, consequently precluding any possibility of the vehicle rolling away.

There are also many known actuating mechanisms. In one embodiment a draw-cone is supported so that it is axially displaceable on the housing, said draw-cone releasing the parking mechanism pawl when in a release position and being drawn between a portion of the housing and an actuating portion of the parking mechanism pawl in order to establish the locked position, so as to provide the parking mechanism pawl with a positively interlocking position in relation to the housing, in which its pawl tooth engages in the parking mechanism tooth system.

For situations in which the pawl tooth rests on a tooth of the parking mechanism tooth system during this actuation sequence, the actuating mechanism may be equipped with a so-called engaging spring, which is then tensioned so that the actuating element shifts the parking mechanism pawl into the locked position owing to the energy stored in the engaging spring as soon as the parking mechanism gear rotates.

Further known actuating mechanisms are embodied in the form of cam elements, which are fixed to a shaft arranged parallel to the pawl axis.

The actuating mechanism may have an interface to a manual gear lever in the interior of the motor vehicle, so that when the lever is shifted into a "P" position the parking mechanism is actuated. Another known approach, on the other hand, is to equip the actuating mechanism with actuators in order to provide a so-called "park-by-wire" parking mechanism system. The actuators may be hydraulic actuators, but they may also contain electromechanical actuators such as shift rollers or drums.

Parking mechanism arrangements are generally subject to tight constraints in terms of design space. Furthermore, in designing the parking mechanism arrangement care has to be taken to ensure that in the park position excessive forces are not introduced into the housing and/or into bearings of the shaft.

Against this background an object of the invention is to specify an improved parking mechanism arrangement for a motor vehicle transmission which will preferably satisfy or improve upon at least one of the aforementioned constraints.

SUMMARY OF THE INVENTION

In the parking mechanism arrangement specified above the aforementioned object is achieved in that the actuating element is embodied as a cam ring, which is arranged concentrically with the shaft and which comprises a cam portion, which acts on the actuating portion in order to establish the locked position.

This development allows the actuating element to be integrated compactly into the transmission even under tight design space constraints. It is furthermore a simple design proposition to support the cam ring concentrically with the shaft and/or concentrically with the parking mechanism gear. The shaft is preferably an output shaft of the motor vehicle transmission.

The pawl axis is preferably aligned parallel to the shaft.

The cam ring may be actuated manually or by way of an actuator device of the actuating mechanism.

The object is therefore achieved in full.

It is especially preferred if the cam ring is supported so that it can rotate in relation to the parking mechanism gear.

The rotatable support may be provided by a slide bearing or a rolling bearing. The cam ring may be rotatably supported on the shaft or on the parking mechanism gear, which is rotationally fixed to the shaft.

It is especially preferred if the parking mechanism gear comprises an axially protruding shoulder portion, on the outer circumference of which the cam ring is supported.

The parking mechanism gear can thereby be pre-assembled with the cam ring, which makes it easier to fit the parking mechanism arrangement in the transmission.

The cam ring may be actuated in various ways, for example through engagement with a tooth system of a shift drum or by another rotational actuating system. The cam ring can preferably be actuated by a rod, however, particularly in the form of a push rod.

It is preferred here if a first end of such a rod of the actuating mechanism is articulated with the cam ring.

This measure allows forces introduced via the rod to be introduced efficiently irrespective of a current rotational position of the cam ring in relation to an axis of the rod. As stated, the rod is preferably a push rod, which is capable of transmitting both thrust forces and tensile forces.

It is especially preferred if the rod is connected to the cam portion.

The cam portion is preferably a portion protruding radially outwards. The articulated connection to the cam portion therefore allows the cam ring to be turned relatively easily. If the cam ring is rotatably supported by way of a rolling bearing such as a needle bearing and/or if a distance between a locking face of the cam portion and the articulated attachment of the rod is small, rotation can ensue due to relatively small forces. Here the cam ring in the area of the cam portion may act as a draw-cone, one side of which is free of friction.

According to a further preferred embodiment a second end of the rod is articulated with an actuating lever of the actuating mechanism.

The actuating lever may be connected, for example, to an interface via which a control cable or some other mechanical coupling to a gear lever can be furnished in a motor vehicle.

The actuating lever may also be rotatable by means of an actuator, however.

Connecting the actuating lever to the cam ring by way of a rod allows the actuating lever to be arranged at a spatially favourable point inside the motor vehicle, in particular in a spatially favourable area regardless of the position of the parking mechanism gear.

The rod may be a one-piece rod, but is preferably a two-piece rod, the two rod parts being coupled by an engaging spring, in order to allow an actuation of the parking mechanism arrangement as described above, even in a situation in which the pawl tooth is resting on a tooth of the parking mechanism tooth system.

It is furthermore advantageous overall if the cam ring is connected to a locking element, which is designed to lock the parking mechanism pawl in the release position when the cam ring is in a release rotational position.

It is generally possible to keep the parking mechanism pawl in the release position by means of a retaining device in the form of a spring. By providing a locking element it is possible, however, to lock the parking mechanism pawl in the release position through a positive interlock. For this purpose the locking element may comprise a locking portion, which acts on a retaining portion of the parking mechanism pawl. The arrangement of the retaining portion and the actuating portion may be offset in a circumferential direction so that as the cam ring rotates it is ensured that the locking element releases the parking mechanism pawl before the cam portion of the cam ring swivels the parking mechanism pawl into the locked position.

A locking pin, which protrudes in an axial direction and on which the locking element acts in the release rotational position, is preferably provided on the parking mechanism pawl. The locking pin here forms a retaining portion. It is furthermore preferred if the cam ring is produced from a solid material, in particular from metal. Here the locking element may be integrally formed with the cam ring. The locking element, however, is preferably embodied as a separate component, which may be of light-weight construction, for example a sheet metal part or the like, since the locking element is not required to transmit large forces.

In this case it is advantageous if the locking element comprises a fastening portion, which is arranged in an axial direction between the cam ring and the parking mechanism gear and which comprises a locking portion extending radially therefrom. Here the fastening portion may be connected to the cam ring by positive interlock in the circumferential direction. An axial bearing may be formed between the fastening portion and parking mechanism gear. However, the fastening portion is preferably supported so that it can otherwise rotate in relation to the parking mechanism gear, for example separated by a suitable distance from the parking mechanism gear.

The fastening portion may preferably be of annular or annular segmental shape. The locking portion may extend from such an annular portion in the manner of a cam.

It is furthermore advantageous overall if the parking mechanism pawl comprises a first pawl portion on which the pawl tooth is formed, and a second pawl portion on which the actuating portion is formed, the first and the second pawl portions being offset in an axial direction.

The first and the second pawl portions, for example, may be connected together by an offset of the parking mechanism pawl.

The first pawl portion is preferably aligned axially with the parking mechanism gear, so as to simplify the pawl tooth design engagement in the parking mechanism tooth system. With this development, moreover, large forces can be transmitted via the parking mechanism pawl.

The second pawl portion is preferably aligned in an axial direction with the cam ring, so that its cam portion can easily act on the actuating portion.

According to a further preferred embodiment, which in conjunction with the pre-characterizing part of claim 1 constitutes a separate invention, the parking mechanism pawl is embodied as a class 1 lever, which has a first lever arm on which the pawl tooth is formed, and a second lever arm on which the actuating portion is formed.

Whereas parking mechanism pawls of conventional design are generally embodied as class 2 or 3 levers, the design of the parking mechanism pawl as a class 1 lever affords a series of advantages. For example, it is easily possible in this case for the cam portion to act on an actuating portion of the parking mechanism pawl pointing in a radial direction towards the parking mechanism gear, so that the cam lever presses the second lever arm radially outwards, which leads to a movement of the first lever arm in a radial direction towards the parking mechanism gear. Suitable selection of the lengths of the lever arms moreover allows forces to be suitably transmitted. This also allows the cam portion or its articulated attachment to a rod or the like to be provided in the best possible spatial position.

It is also advantageous with this development if the shaft is operatively connected by a geartrain to a rotational element of the motor vehicle transmission, the parking mechanism pawl being supported in relation to the housing and the shaft so that an engagement between the pawl tooth and the parking mechanism tooth system is located in the area of a connecting line between an axis of the shaft and an axis of the rotational element.

The rotational element may, in particular, be a drive element of a differential.

An arrangement in the area of such a connecting line should here be taken to mean that the engagement between the pawl tooth and the parking mechanism connection is located in an angle range of $\pm 50°$ in relation to the connecting line, in particular in a range of $\pm 30°$, preferably in a range of $\pm 20°$. It is especially preferred if the engagement between the pawl tooth and the parking mechanism tooth system lies directly on the connecting line between the axes.

The reason for this preferred arrangement lies in the fact that due to the forces acting on the drive wheels, the rotational element generally exerts a comparatively high torque on the parking mechanism gear. Acting on the parking mechanism gear on the other hand are tangential forces, which in the case of an unfavorable location of the engagement between the pawl tooth and the parking mechanism connection may be added to the forces exerted by the differential.

Where the engagement between the pawl tooth and the parking mechanism tooth system is located in the area of the connecting line, however, these forces can act in substantially the opposite direction, so that forces which are exerted on the shaft and possibly on a bearing of the shaft by the parking mechanism gear can be reduced.

Configuring the parking mechanism pawl as a class 1 lever moreover affords favorable design scope for such a location of the engagement between the pawl tooth and the parking mechanism tooth system, since in this case the location of the actuating portion and the location of the engagement may be situated relatively far apart in a circumferential direction, so that despite such a preferred engagement between the parking mechanism pawl and the parking mechanism tooth system, a conveniently designed actuation of the parking mechanism arrangement can be accomplished.

The locking element may furthermore comprise a guide portion, which in the release position acts on the actuating portion at the second lever arm. This means firstly that the cam portion can be of comparatively short design in a circumferential direction. Furthermore, it means that both sides of the parking mechanism pawl class 1 lever are fixed in a radial direction, so that rattling noises or the like can be prevented.

It goes without saying that the features specified above and those yet to be explained below can be used not only in the particular combination specified but also in other combinations or in isolation without departing from the scope of the present invention.

BRIEF DESCRIPTION OF THE DRAWINGS

Exemplary embodiments of the invention are represented in the drawings and are explained in more detail in the following description. In the drawings:

FIG. 7 shows an axial top view of the parking mechanism arrangement in FIGS. 3 to 6 from the opposite axial side;

FIG. 8 shows a sectional view along the line VIII-VIII in FIG. 7;

FIG. 9 shows a radial top view of the parking mechanism arrangement in FIGS. 3 to 8;

FIG. 10 shows a schematic representation of the position of an engagement between a pawl tooth and a parking mechanism tooth system in relation to axes of a shaft and a differential coupled thereto by a geartrain; and FIG. 11 shows a vector representation of the forces acting in the engagement in FIG. 10.

DESCRIPTION OF PREFERRED EMBODIMENTS

Figure 1:
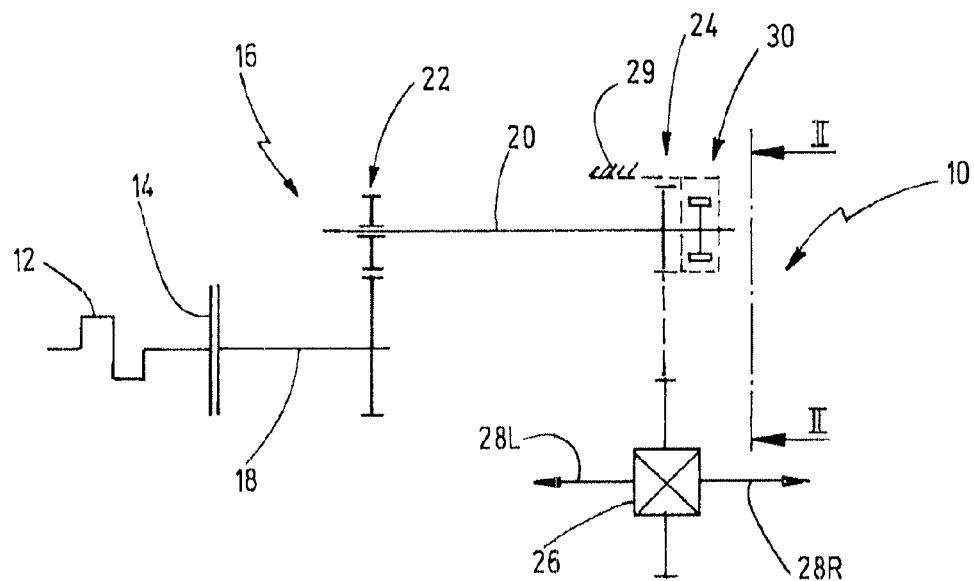
FIG. 1 shows a schematic representation of a drivetrain of a motor vehicle having a motor vehicle transmission, which may be equipped with a parking mechanism arrangement according to the invention.

In FIG. 1 a drivetrain for a motor vehicle is represented schematically and denoted by the reference numeral 10. The drivetrain 10 comprises a driving engine 12 such as an internal combustion engine or a hybrid drive unit. The drivetrain 10 further comprises a friction clutch arrangement, which is connected on the input side to the driving engine 12 and on the output side to a step-variable transmission 16. The step-variable transmission 16 comprises an input shaft arrangement 18, which is connected to an output element or output elements of the clutch arrangement 14. The step-variable transmission 16 further comprises an output shaft 20. The input shaft 18 is connected to the output shaft 20 by a first geartrain 22, for example, the first geartrain 22 possibly being a shiftable geartrain, for example. The output shaft 20 is connected to a differential 26 by a second geartrain 24, the second geartrain 24 being non-shiftable, that is to say it is embodied as a constant geartrain. The differential 26 is designed to distribute drive power to driven wheels 28L, 28R. The step-variable transmission 16 may be embodied as an automated shift transmission, as a manual step-variable transmission or as a dual-clutch transmission. The step variable transmission 16 may furthermore be designed for installation lengthways, or preferably, as shown, for front transverse installation in the motor vehicle. The step-variable transmission 16 further comprises a schematically indicated housing 29.

A parking mechanism arrangement 30, which is assigned to the output shaft 20 and which may be supported on the housing 29, in order to immobilise a motor vehicle equipped with the drivetrain 10, is arranged in the step-variable transmission 16.

Figure 2:
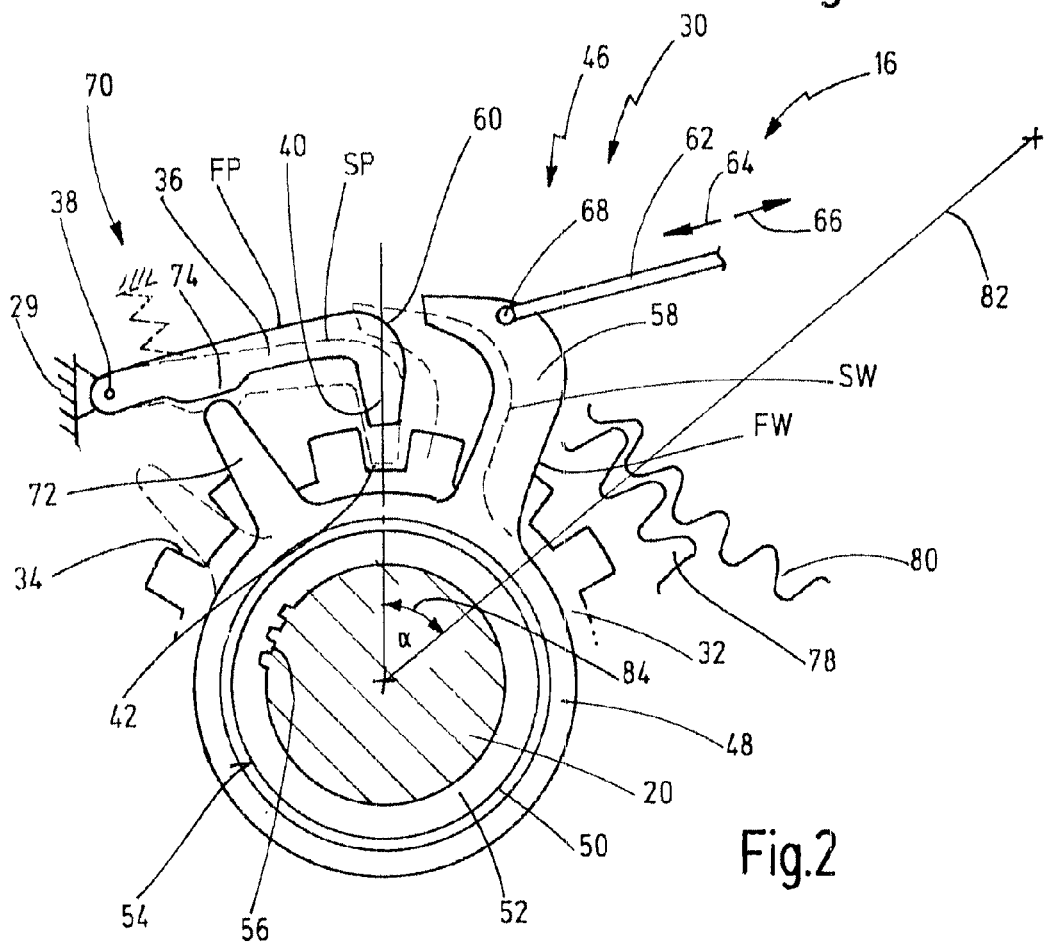
FIG. 2 shows a schematic axial view of a portion of the motor vehicle transmission and a parking mechanism arrangement formed thereon.

FIG. 2 in a schematic representation shows a view II-II in FIG. 1.

Accordingly, the parking mechanism arrangement 30 comprises a parking mechanism gear 32, which is rotationally fixed to the output shaft 20. A parking mechanism tooth system 34 is formed on an outer circumference of the parking mechanism gear 32. The parking mechanism arrangement 30 further comprises a parking mechanism pawl 36, which is designed so that it can pivot about a pawl axis 38. The pawl axis 38 is fixed to the housing and is preferably aligned parallel to the shaft 20.

A pawl tooth 40, which is capable of engaging in a tooth space 42 of the parking mechanism tooth system 34 in order to establish the locked position SP of the parking mechanism arrangement 30, is formed on the parking mechanism pawl 36.

An actuating mechanism 46 is provided for actuating the parking mechanism pawl 36. The actuating mechanism 46 comprises a cam ring 48, which is supported by way of a rotational bearing 50 so that it can rotate in relation to the shaft 20 and the parking mechanism gear 32, and concentrically therewith. In particular, the cam ring 48 may be supported by way of the rotational bearing 50 on an outer circumference 54 of a shoulder portion 52, which is part of the parking mechanism gear 32 and extends axially with respect to a main portion of the parking mechanism gear 32.

A schematically indicated spline toothing, which serves to rotationally fix the parking mechanism gear 32 to the shaft 20, is furthermore shown at 56.

The cam ring 48 comprises a cam portion 58, which protrudes radially with respect to a main portion of the cam ring 48, preferably beyond the parking mechanism tooth system 34. The parking mechanism pawl 36 comprises an actuating portion 60, on which the cam portion 58 is capable of acting. Here the actuating portion 60 is formed in the area of a radial outer side of the parking mechanism pawl 36. The cam portion 58 is of hooked design and with the parking mechanism pawl 36 in the release position FP shown in solid lines releases the parking mechanism pawl 36. The corresponding release rotational position of the cam ring 48 or the cam portion 58 is shown by FW in FIG. 2.

When the cam ring 48 is moved from the position shown by solid lines in FIG. 2 counterclockwise towards the parking mechanism pawl 36, the cam portion 58 catches the actuating portion 60 and swivels the parking mechanism pawl 36 radially towards the parking mechanism gear 32, so that the pawl tooth 40 engages in a tooth space 42. In so doing the cam portion 58 latches over the parking mechanism pawl 36, so that the latter is preferably held in this locked position SP by positive interlock. This is represented by dashed lines in FIG. 2. The corresponding locking rotational position SW of the cam ring 48 or the cam portion 58 is likewise represented by dashed lines.

The actuating mechanism 46 further comprises an actuating rod 62, which preferably extends approximately tangentially to the parking mechanism gear 32 and can be moved in a locking direction 64 and in an opposing release direction 66. The actuating rod 62 is connected by an articulation 68 to the cam ring 48, preferably to the cam portion 58, as shown. The actuating rod 62 is preferably embodied as a combined push and draw rod, so that both forces for shifting the cam ring 48 into the locking rotational position SW and forces in the opposite direction for moving the cam ring 48 into the release rotational position FW can be exerted on the cam ring 48. The actuating rod 62 can be connected to further elements of the actuating mechanism 46, for example to an actuating lever. The further elements of the actuating mechanism 46 may be manual actuating elements, which are coupled to a manual gear selector lever of the motor vehicle, for example, but they may also be actuator elements which furnish a "park-by-wire" parking mechanism system.

In order to keep the parking mechanism pawl 36 in the release position FP, a retaining device 70 may be provided, as is indicated schematically in FIG. 2 by a helical tension spring. In the present case, however, the parking mechanism pawl 36 is positively held in the release position FP by means of a locking element 72, that is to say it is locked in the release position FP. The locking element 72 is connected to the cam ring 48 and acts, for example, on a radial inner side of the parking mechanism pawl 36, in particular on a retaining portion 74 of the parking mechanism pawl 36. In the release rotational position FW the locking element 72 keeps the parking mechanism pawl 36 in the release position FP, so that accidental engagement of the pawl tooth 40 in a tooth space 42 can be reliably prevented. In the present case, the spring indicated schematically in FIG. 2 may be a compression spring, which presses the parking mechanism pawl 36 in a radial direction against the locking element 72. When the cam ring 48 rotates into the locking rotational position SW, the locking element 72 releases the retaining portion 74, so that the cam portion 58 can press the parking mechanism pawl 36 into the locked position SP.

The interaction of the locking element 72 and the retaining portion 74 is likewise in the nature of a cam engagement, so that when the cam ring 48 turns back into the release rotational position FW the locking element 72 forcibly carries the parking mechanism pawl 36 from the locked position SP into the release position FP.

FIG. 2 furthermore shows that a driven gearwheel 78 is arranged coaxially with the output shaft 20. The driven gearwheel 78 is preferably rotationally fixed to the output shaft 20 and meshes with a differential drive gearwheel 80, which drives a differential cage of the differential 26.

A connecting line between the axes of the driven gearwheel 78 and of the differential drive gearwheel 80 is shown by 82 in FIG. 2.

For reasons yet to be explained below, the area of the engagement of the pawl tooth 48 in the parking mechanism tooth system 34 is situated in an area of this connecting line 82, that is to say in an area of ±50° in relation to the connecting line 82, preferably in an area of ±30°, in particular in an area of ±15° in relation to the connecting line 82.

The following FIGS. 3 to 9 show a further embodiment of a parking mechanism arrangement 30, which in terms of construction and working principle corresponds generally to the parking mechanism arrangement 30 in FIG. 2. The same elements are therefore identified by the same reference numerals. It is substantially the differences which are explained below.

Figure 3:
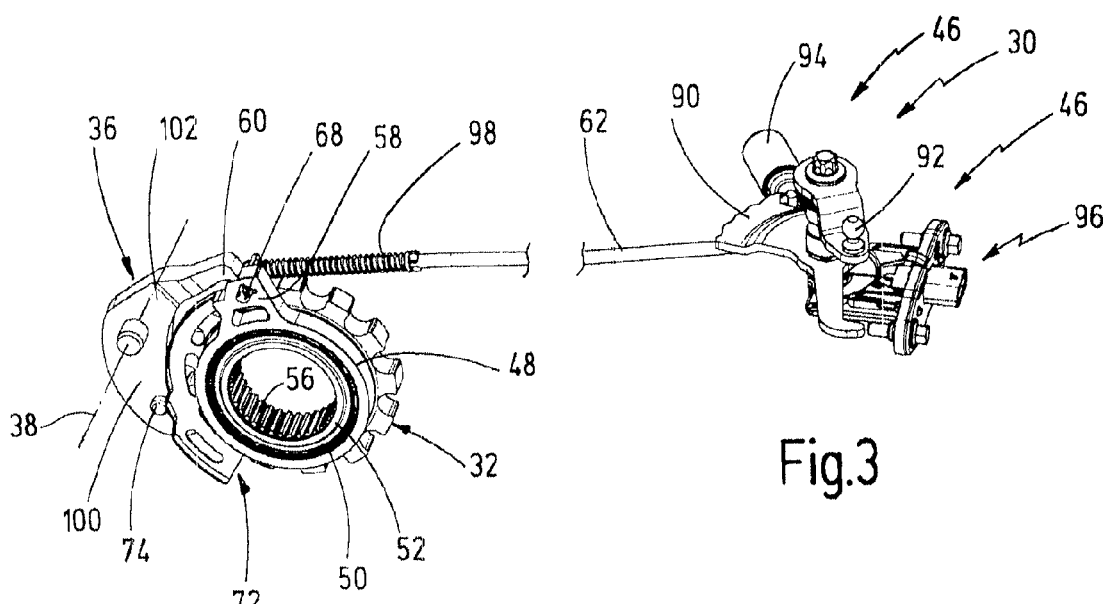
FIG. 3 shows a perspective view of a further embodiment of a parking mechanism arrangement according to the invention.

FIG. 3 first shows a further portion of the actuating mechanism, namely that portion which is connected to a second end of the actuating rod 62. This portion comprises an actuating lever 90, which can be pivoted about an axis fixed to the housing. The actuating lever 90 is connected to an interface 92, to which a gearshift cable can be connected, for example, which is connected to a gearshift lever or selector lever in the motor vehicle interior. This portion further comprises a detent bushing 94, which serves to keep the actuating lever 90 in various detent positions. The detent bushing 94 here acts on an outer circumferential portion of the actuating lever 90. Finally this portion preferably comprises a sensor arrangement 96, which serves for registering the current rotational position of the actuating lever 90. The actuating lever 90 is connected to the actuating rod 62 by an articulated connection, not shown in more detail.

In this embodiment the actuating lever 62 itself is of two-piece design, an engaging spring 98, which is tensioned when the parking mechanism arrangement 30 is moved into the locked position SP whilst the pawl tooth 40 is resting on a tooth of the parking mechanism tooth system 34, acting between these parts, which are displaceable coaxially with one another.

In this embodiment the parking mechanism pawl 36 is furthermore embodied as a class 1 lever having a first lever arm 100 and a second lever arm 102. The first lever arm 100 is connected to the pawl tooth 40. An axially protruding pin 74, which constitutes a retaining portion 74 for locking the parking mechanism pawl 36 in the release position FP, is furthermore formed on the first lever arm 100. In this embodiment the actuating portion 60 of the parking mechanism pawl 36 is formed on the second lever arm 102, that is to say on a radially inner portion of the second lever arm 102. The cam portion 58 of the cam ring 48 is designed so that it presses the second lever arm 102 radially outwards in order to carry the parking mechanism pawl 36 from the release position FP into the locked position SP, thereby moving the first lever arm 100 inwards in a radial direction towards the parking mechanism tooth system 34.

Figure 5:
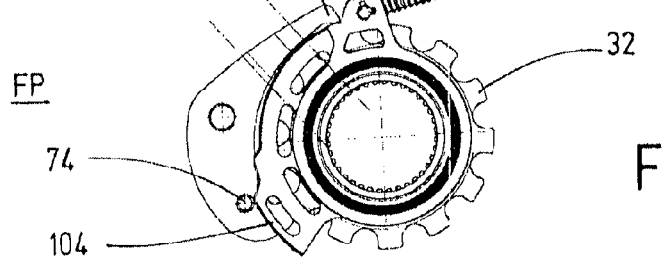
FIG. 5 shows a representation of the parking mechanism arrangement comparable to FIG. 4 in a first release position, in which a second lever arm is supported on a part of the cam portion.
Figure 6:
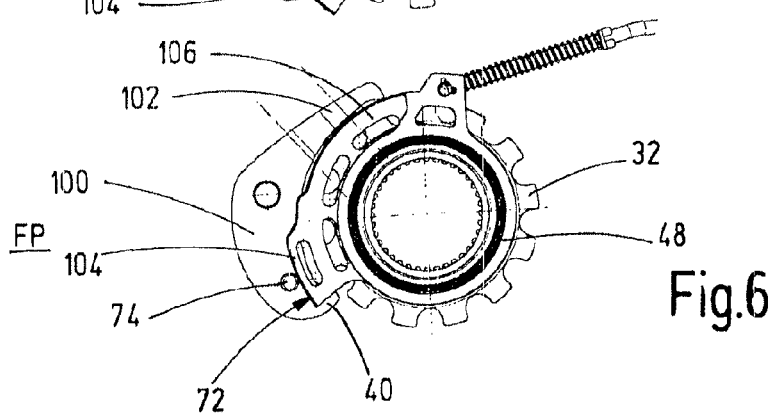
FIG. 6 shows a representation of the parking mechanism arrangement comparable to FIG. 5 in a further release position, in which a second lever arm is supported on a guide portion of a locking element.

The cam ring 48 is rotatably supported by a rotational bearing 50 on an outer circumference of a shoulder portion of the parking mechanism gear 32 and comprises the radially protruding cam portion 58. Here the cam ring 48 is produced in one piece from a solid material, in particular from metal. In this embodiment the locking element 72 is embodied as a separate component of light-weight construction, in particular as a sheet-metal component, and comprises a locking portion 104, which acts in the manner of a cam on the retaining portion in the form of a pin 74, in order to lock the parking mechanism pawl 36 in the release position FP. The locking element 72 further comprises a guide portion 106, which extends between the locking portion 104 and the cam portion 58, and with a guide portion of the cam portion 58 is oriented tangentially in a circumferential direction. As is shown in FIG. 5, when transferred from the locked position SP into the release position FP, the actuating portion 60 slides down on to such a guide portion of the cam portion 58, from where it is led on to the guide portion 106 of the locking element 72 as the cam ring 48 turns further. In the release position FP the parking mechanism pawl 36 in the form of the class 1 lever is consequently supported on both lever arms 100, 102, that is to say in a radial direction, by means of the locking element 72.

Figure 4:
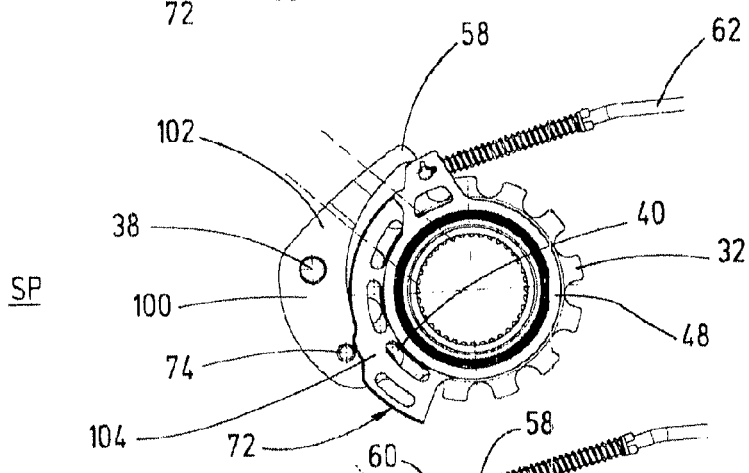
FIG. 4 shows an axial top view of the parking mechanism arrangement in FIG. 3 in a locked position.

When turning back into the locked position SP the actuating portion 60 is then first led on to the guide portion of the cam portion 58 and is then pressed radially outwards by the cam portion 58 into the locked position SP shown in FIG. 4.

FIG. 8 shows that the locking element 72 comprises a fastening portion 108, which may be arranged in a radial direction between the cam ring 48 and the parking mechanism gear 32 and is preferably of annular or annular segmental shape. The fastening portion 108 is rotationally fixed to the cam ring 48 and is designed so that it can rotate in relation to the parking mechanism gear 32.

As is shown in FIG. 9, the parking mechanism pawl 36 comprises a first pawl portion 110, which is aligned in an axial direction with the parking mechanism gear 32. The pawl tooth 40 is formed on this first pawl portion 110. The first pawl portion 110 extends over the first lever arm 100 and over a portion of the second lever arm 102. In the area of the second lever arm 102 the parking mechanism pawl 36 further comprises a second pawl portion 112, which is offset in an axial direction in relation to the first pawl portion 110. The second pawl portion 112 is connected to the first pawl portion 110 by an offset portion or an offset. The second pawl portion 112 is axially aligned with the cam ring 48.

FIGS. 10 and 11, again in schematic form, show what forces act on the parking mechanism gear 32 and consequently on the shaft 20 rigidly connected thereto, and therefore on its pivot bearing or shaft bearing. Firstly, torques TDIFF, which are introduced via the differential and the differential drive gear 80, give rise to a tangential force FDIFF acting on the point of engagement between the tooth systems of the gearwheels 78, 80 via which a torque is exerted on the shaft 20, which acts in a specific direction according to the angle of inclination at which the vehicle is standing, as is represented in FIGS. 10 and 11.

Also acting on the shaft 20 via the parking mechanism arrangement 30 are forces which preferably compensate at least partially for this force FDIFF, that is to say a force FPS1 in the area of the engagement of the pawl in the parking mechanism tooth system 34 and a force FPS2 between the actuating portion 60 and the cam portion 58. The force FPS2 is generally significantly less than the force FPS1.

The resulting forces can be seen from FIG. 11, from which a force FAW results, which acts on the shaft 20 and consequently on the shaft bearing. If, as shown, the area of the engagement between the pawl tooth 40 and the parking mechanism tooth system 34 lies in the area of the connecting line 82, the force FAW is preferably very small, so that the load on the shaft bearing is relatively low.

The invention claimed is:

1. A parking mechanism arrangement for a motor vehicle transmission, having:
   a housing and a shaft supported so that the shaft can rotate in relation to the housing;
   a parking mechanism gear which is rotationally fixed to the shaft and comprises a parking mechanism tooth system;
   a parking mechanism pawl which is supported so that it the parking mechanism pawl can pivot about a pawl axis in relation to the housing and comprises a pawl tooth, which is capable of engaging in a tooth space of the parking mechanism tooth system in order to establish a locked position; and
   an actuating mechanism which comprises an actuating element, which acts upon an actuating portion of the parking mechanism pawl in order to pivot the parking mechanism pawl from a release position into the locked position;
   wherein the actuating element is embodied as a cam ring, which is arranged concentrically with the shaft and which comprises a cam portion, which acts on the actuating portion in order to establish the locked position.

2. The parking mechanism arrangement according to claim 1, wherein the cam ring is supported so that it can rotate in relation to the parking mechanism gear.

3. The parking mechanism arrangement according to claim 1, wherein the parking mechanism gear comprises an axially protruding shoulder portion, on the outer circumference of which the cam ring is supported.

4. The parking mechanism arrangement according to claim 1, wherein a first end of a rod of the actuating mechanism is articulated with the cam ring.

5. The parking mechanism arrangement according to claim 4, wherein a second end of the rod is articulated with an actuating lever of the actuating mechanism.

6. The parking mechanism arrangement according to claim 1, wherein the cam ring is connected to a locking element, which is designed to lock the parking mechanism pawl in the release position when the cam ring is in a release rotational position.

7. The parking mechanism arrangement according to claim 6, wherein the locking element comprises a fastening portion, which is arranged in an axial direction between the cam ring and the parking mechanism gear and which comprises a locking portion extending radially therefrom.

8. The parking mechanism arrangement according to claim 1, wherein the parking mechanism pawl comprises a first pawl portion on which the pawl tooth is formed, and a second pawl portion on which the actuating portion is formed, the first and the second pawl portions being offset in an axial direction.

9. The parking mechanism arrangement according to claim 1, wherein the parking mechanism pawl is embodied as a class 1 lever, which has a first lever arm on which the pawl tooth is formed, and a second lever arm on which the actuating portion is formed, wherein the pawl axis is arranged between the first lever arm and the second lever arm.

10. The parking mechanism arrangement according to claim 9, wherein the shaft is operatively connected by a geartrain to a rotational element of the motor vehicle transmission, the parking mechanism pawl being supported in relation to the housing and the shaft so that an engagement between the pawl tooth and the parking mechanism tooth system is located in an area of a connecting line between an axis of the shaft and an axis of the rotational element.

11. A parking mechanism arrangement for a motor vehicle transmission, having:
   a housing and a shaft supported so that the shaft can rotate in relation to the housing;
   a parking mechanism gear which is rotationally fixed to the shaft and comprises a parking mechanism tooth system;
   a parking mechanism pawl which is supported so that the parking mechanism pawl can pivot about a pawl axis in relation to the housing and comprises a pawl tooth, which is capable of engaging in a tooth space of the parking mechanism tooth system in order to establish a locked position; and an actuating mechanism which comprises an actuating element, which acts upon an actuating portion of the parking mechanism pawl in order to pivot the parking mechanism pawl from a release position into the locked position;

wherein the parking mechanism pawl is embodied as a class 1 lever, which has a first lever arm on which the pawl tooth is formed, a second lever arm on which the actuating portion is formed, and the pawl axis is arranged between the first lever arm and the second lever arm; and wherein the shaft is operatively connected by a geartrain to a rotational element of the motor vehicle transmission, the parking mechanism pawl being supported in relation to the housing and the shaft so that an engagement between the pawl tooth and the parking mechanism tooth system is located in an area of a connecting line between an axis of the shaft and an axis of the rotational element.

* * * * *